United States Patent [19]

Simonton

[11] Patent Number: 4,906,536
[45] Date of Patent: Mar. 6, 1990

[54] TUBELET PANEL AND METHOD OF MANUFACTURE THEREOF

[75] Inventor: Robert D. Simonton, Fremont, Ohio

[73] Assignee: Fremont Special Machine Company, Inc., Fremont, Ohio

[21] Appl. No.: 268,335

[22] Filed: Nov. 7, 1988

Related U.S. Application Data

[62] Division of Ser. No. 941,719, Dec. 15, 1986, Pat. No. 4,783,234.

[51] Int. Cl.⁴ .............................................. H01M 2/18
[52] U.S. Cl. .................................... 429/140; 429/141
[58] Field of Search ............... 429/140, 141, 131, 144, 429/233, 238

[56] References Cited

U.S. PATENT DOCUMENTS

| | | | |
|---|---|---|---|
| 1,243,371 | 10/1917 | Willard | 429/140 |
| 1,409,895 | 3/1922 | Knoblock | 429/140 |
| 2,176,428 | 10/1917 | Kershaw . | |
| 2,266,546 | 12/1941 | Galloway | 429/140 |
| 2,343,970 | 3/1944 | Galloway . | |
| 2,350,752 | 6/1944 | Graf . | |
| 2,755,328 | 7/1956 | Martin | 429/140 |
| 2,972,000 | 2/1961 | Boriolo . | |
| 2,985,701 | 5/1961 | Brennan | 429/140 |
| 2,992,673 | 7/1961 | Bishop | 156/197 |
| 3,070,475 | 12/1962 | Carlson et al. | 428/119 |
| 3,246,058 | 4/1966 | Voelker | 428/119 |
| 3,247,039 | 4/1966 | Schultheiss | 156/167 |
| 3,462,305 | 8/1969 | Fahrback . | |
| 3,721,051 | 6/1974 | Witlers | 428/188 |
| 3,741,857 | 6/1973 | Katutani et al. | 428/188 |
| 3,843,412 | 10/1974 | Sundberg . | |
| 3,919,445 | 11/1975 | Smarook | 428/119 |
| 3,933,549 | 1/1976 | Heimann et al. | 156/324 |
| 4,140,839 | 2/1979 | Hoffman et al. | 429/140 |
| 4,276,359 | 6/1981 | Sundberg | 429/140 |
| 4,374,908 | 2/1983 | Lindholm | 429/140 |
| 4,488,929 | 12/1984 | Ostertag | 156/292 |

FOREIGN PATENT DOCUMENTS 1187425 4/1970 United Kingdom .

Primary Examiner—Anthony Skapars
Attorney, Agent, or Firm—David H. Wilson

[57] ABSTRACT

A tubelet panel of fabric face sheets and parallel, continuous film, partition strips normal to the face sheets and having their longitudinal edges fused into the fabric of the face sheets is formed by thermal fusion by applying heat and pressure to the outer surfaces of the face sheets in the regions in registry with the partition edges. The partition material is chosen to have a lower melting temperature than the face sheet material and the applied heat is at a temperature above the melting temperature of the partition material and below the melting temperature of the face sheet material. Parallel tines spaced about the thickness of the partition strips guide the strips through a bonding region for one face sheet followed along the path of advance of the face materials and partition strips by a bonding station for the other face sheet and are of a thickness which varies as the bonds are progressively formed to limit the displacement of heating means against the partition edges to the amount of material of the edges to be fused into the bond. Adjuncts include feeding of the face sheet material and partition material as strip stock, as from a reel, slitting the partition material to the desired strip width in line, and cutting off lengths of the tubelet panel as for battery plate casing lengths.

6 Claims, 3 Drawing Sheets

TUBELET PANEL AND METHOD OF MANUFACTURE THEREOF

This is a division, of application Ser. No. 06/941,719, filed Dec. 15, 1986 now U.S. Pat. No. 4,783,234.

This invention relates to panels made up of arrays of parallel contiguous, longitudinal tubes in side-by-side relationship, to such panels suitable for electrode casings for plates for storage batteries and to methods of and apparatus for the manufacture of such panels.

Heretofore it has been known to form storage battery electrodes as planar arrays of straight parallel tubes of electrical insulating materials which are resistant to the adverse effects of battery electrolytes and the electrochemical reactions which occur in batteries. Electrodes are formed by filling the tubes with active electrode material, inserting metal rods along the central axes of the tubes and electrically interconnecting the rods with a cross bar. In lead acid batteries, the rods and cross bars are predominantly of lead and the active material is the lead and lead oxide utilized for the positive and negative electrodes of such batteries. U.S. Pat. No. 1,243,371 of Oct. 16, 1917 to T. A. Willard disclosed an array of porous tubes for storage batteries made up of two plates, each having a plurality of right-circular, semicylinders and made from sheets of rubber and porous material formed with minute pores uniformly distributed and extending through the sheets. The plates were joined together as by vulcanizing. An array of polygonal shaped tubes joined as panels by intermediate webs are disclosed for positive and negative battery electrodes in U.S. Pat. No. 1,409,895 of Mar. 12, 1922 to Knoblock, et al. The array of tubes for the casings are made of a porous non-conducting material, preferably earthenware. Galloway, U.S. Pat. No. 2,266,546 of Dec. 16, 1941 disclosed a storage battery plate made up of a row of pencils of active material on metal spines connected by a metal bar and surrounded by a band of acid resistant fabric seamed between the individual pencils to form connected sheaths of circular cross section. In U.S. Pat. No. 2,343,970 of Mar. 14, 1944, Galloway proposed a strip of thermoplastic cement between the individual pencils and the confronting faces of the fabric bonded by heat and pressure applied through the fabric. Brennan U.S. Pat. No. 2,985,701 joined fabric face panels with overlaying plastic grids on the outer faces of the fabric and joined by internal pins extending through the fabric to form the separate tubes of an electrode array.

Square cross section tubes in parallel array were proposed in Martin U.S. Pat. No. 2,755,328 of July 17, 1956 where two channel sections of molded plastic having parallel slots through their walls were cemented together and then joined as a flat panel array to form electrode casings. Injection molded polystyrene was proposed as a suitable material resistant to sulphuric acid.

Braided or knitted tubes of polyvinyl esters and other acrylic resins and polystyrene were suggested as envelopes for arrays of pencils of active material on lead spines in Kershaw U.S. Pat. No. 2,176,428 of Oct. 17, 1939. Graff U.S. Pat. No. 2,350,752 of June 6, 1944 shows an array of tubes for encasing pencils for electrodes made of woven fabric of glass or synthetic resin where the fabric layers of a sheath are interwoven by weft threads between the pencils. A similar arrangement coupled with thermally shrinking the interwoven fabric onto the pencils is proposed in Boriolo, U.S. Pat. No. 2,972,000 of Feb., 1961. Lindholm et al. U.S. Pat. No. 4,374,908 of Feb. 22, 1983 employs electrolytepermeable tube casings of oval cross section from a woven sock of glass fiber and a perforated outer housing of plastic in a parallel flat panel array for battery electrodes and spacer ribs of polyethylene or polystyrene between the tubes and separator sheets.

Non-woven fabric has also been proposed for various tubular casings for storage battery electrodes in Fahrbach U.S. Pat. No. 3,462,305 of Aug. 19, 1969 where superposed needled batts of intertangled textile fibers are sewn with rows of stitching at spaced intervals to join the batts and form tubes into which are inserted forms to hold the tube shape while the fabric is treated with a hardener. Hoffman et al. U.S. Pat. No. 4,140,839 of Feb. 20, 1979 addresses the problem of withstanding expansion forces of the electrodes encased by non-woven textile sheet material sewn into tubelets by reinforcing the sheet with a woven or laid fabric.

A continuous and progressive process for forming tubular casings for battery electrodes is disclosed in Sundberg U.S. Pat. No. 4,276,359 of June 30, 1981. Arrays of parallel tubes of fabric are formed by overlaying two lengths of felted or woven fibers of glass or plastic such as polyester, propathene, or other acid proof plastic, applying plastic net or a highly perforated plastic sheet against the outer sides of the sheets. The layered structure is face bonded along spaced bands extending longitudinally of the strip sheets by the application of heat and pressure on those bands. Where glass or polyester is employed, tapes of polyethylene or propathene are face bonded at the bands by the heat and pressure. Subsequent processing is required to open the unbonded regions or flat tubes between the bond bands by insertion of mandrels. It is suggested that the final tube form for introduction of active material and electrode spines can be achieved with heat and forming tools either internal or outside of the sandwiched structure for certain materials or the material when formed in that manner can be impregnated with a hardening material.

It is an object of the present invention to improve the tube panel structure for battery electrode casings, the method of manufacture of such structures and the manufacturing apparatus. More particularly objects of this invention are to improve the tube casings, to reduce their cost of materials and fabrication, to simplify their manufacture, and to reduce the number of elements and processing steps in their manufacture.

In accordance with the above objects one feature of this invention is a tube array comprising a pair of opposed generally planar parallel face panels of a first sheet material joined by a plurality of parallel partitions of a second material perpendicular to the general plane of the panels and edge bonded thereto. The face panels can be of a fabric and can be preformed parallel to the partitions whereby the tubes can be of polygonal cross section such as hexagonal or octagonal. Where the face panels are flat, the cross section of the tubes is rectangular.

In an electrode casing application, the face panels can be of felted or woven fibers of glass or plastic which is inert to the materials and processes within a battery and is porous to the electrolyte and ionic flow while the partitions can be of film providing smooth surfaces for facilitating the introduction of active material into the tubes. An advantageous combination is face panels of felted polyester fibers needled and impregnated with a stiffener such as acrylic acid and partitions of polyethylene or polyolifine film of a thickness to form a rigid array yet suitable to be fed to the forming apparatus from a coiled supply.

Another feature is the thermal fusion under pressure of the partition edges into the face panel fiber interstices to provide a strong bond of a width greater than the partition thickness which withstands the stresses imposed in the expansion of the electrode active material during battery operation.

Continuous formation of tube arrays from strip stock is accomplished in a single pass with apparatus which feeds the sheet material of the facing panels and partitions from rolls, slits the partition sheet to appropriate width, orients the facing and partitions for bonding, bonds the partitions along their longitudinal edges to the respective facing panels and cuts off appropriate lengths of the formed tubular array as it issues from the forming region. Where longitudinal ridges are desired, as for formation of tubes of polygonal cross section, a forming section for the face panel sheets can precede the introduction of those sheets into the bonding stations. Thus finished tube arrays are formed in a single pass.

Another feature involves control of the extent of the bond of the longitudinal edges of the partition strips in the face panels by means of internal guides cooperating with the means applying heat and pressure to limit the relative displacement of the partition edges and face panels during the interval those edges are molten or softened. An array of tines extend longitudinally of the feeding path for the facing and partition materials are spaced to confine the faces of the partitions perpendicular to the face panels in slots between adjacent tines. The width of the tines and their transverse spacing is maintained along their lengths while their thickness is tapered in the bonding stations so that the longitudinal edges are progressively advanced into the face panels by opposed surfaces imposing pressure at each side of the tine defined slots.

The above and additional objects and features of this invention will be appreciated more fully from the following detailed description when read with reference to the accompanying drawings in which.

Figure 1:
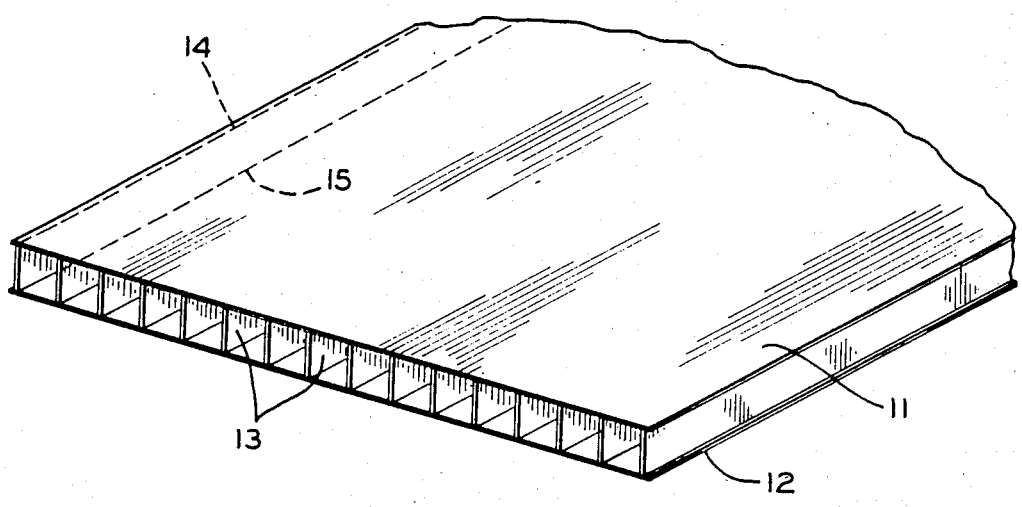
FIG. 1 is a fragmentary view of an array of square tubular casings for an electrode of a storage battery according to this invention.
Figure 2:
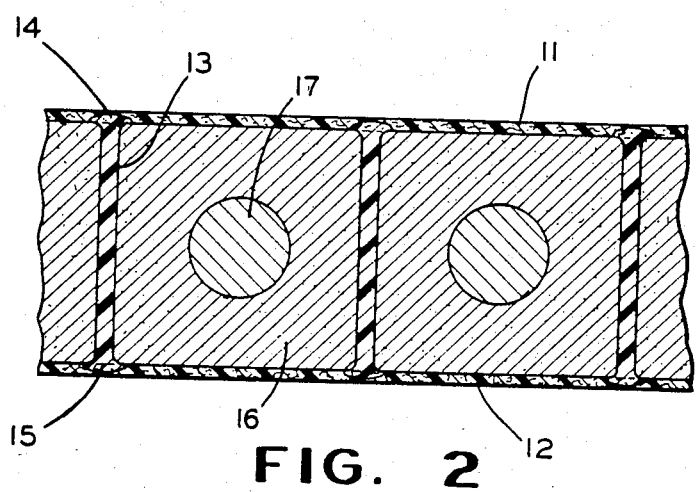
FIG. 2 is an enlarged fragment of a cross section of the array of FIG. 1 with active material and electrode spines in place within the tubes.

The array of tubes disclosed in FIGS. 1 and 2 comprise generally flat face panels 11 and 12 spaced apart and longitudinally partitioned into square tubes by flat partition strips 13 of uniform and equal width having longitudinal edge bonds 14 and 15 joined to panels 11 and 12. A suitable face panel material is Pellon style 2131 supplied by Pellon Corporation, 20 Industrial Avenue, Chelmsford, Massachusetts, as a felted fabric of staple fibers of polyester needled and stiffened with 20 grams per square meter of acrylic acid. A suitable partition material is a high density polyethylene film between 0.015 and 0.030 inch thick.

Bonds are formed for battery purposes by applying heat and pressure through the face panels 11 and 12 while the longitudinal edges of strips of the partition material are maintained against the panels. In such a process the melting temperature of the face panel material should be sufficiently above the melting temperature of the partition material that a reasonable range of processing temperatures are available to heat the partition material to its melting temperature without melting the face panel material even when the heat is applied through the face panel.

In practice with the exemplary materials the bonds 14 and 15 are developed over a region within the fiber interstices of the face panels 11 and 12 of greater width than the thickness of the partitions 13 and extend into the fiber interstices through the thickness of the face panels. Thus with face panels of about 0.010 inch thickness, the partition edge is melted down about 0.030 inch along the longitudinal margin engaging the face panel to develop a bond over a band having a width of about 0.040 inch within the face panel and having corner fillets between the panel and partition for a 0.020 inch thick partition. The high density polyehtylene melts at about 320° F. and the bonding temperature is about 330° F. where the polyester face panel fabric melts around 400° F.

Battery plates are formed from the tubular array by conventional techniques involving plugging one end of the tube of an array, injecting active material 16 into the tubes and inserting electrode spines 17 into each tube as shown in FIG. 2. The active material is inserted as a thick paste. The use of smooth film partitions facilitates the paste insertion.

Figure 3:
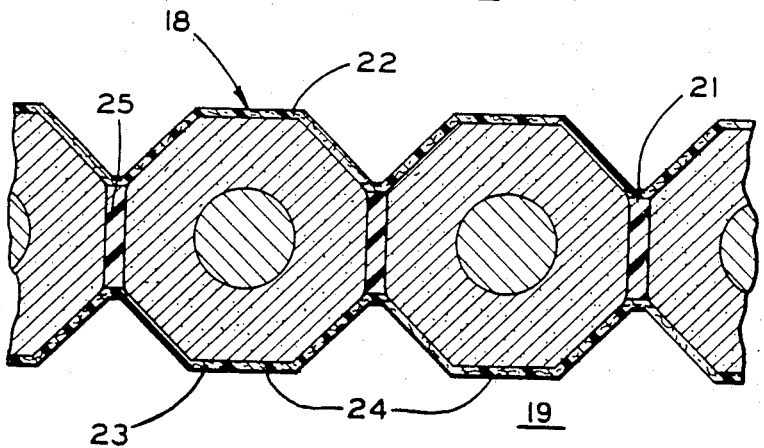
FIG. 3 is a cross section similar to FIG. 2 of tubes of octagonal cross section.

An alternative form of tube array is shown in FIG. 3 wherein the fabric surface permeable to electrolyte and ionic flow is increased and channels for electrolyte flow in the battery plate stack are provided by employing a polygonal tube cross section 18 in a planar array 19. A longitudinally extending series of V grooves 21 are equally spaced across the width of each of face panels 22 and 23 with the length of the arm of each V and of the flat 24 between adjacent Vs being equal so that partitions 25 of that final width form equilateral octagons 18 as the tube cross sections when the V groove apexes are aligned across the thickness of the array. The face panels 22 and 23 can be formed over an anvil while the impregnated felted polyester fabric is heated to its softening temperature. In the continuous tube forming process to be discussed, such surface forming can be accomplished in line with the other fabricating steps. However, the surfaces of the bonding regions should conform to the grooved surface of panels 22 and 23, at least to the extent of applying bonding heat to the panel surface bands in registry with the partition edges.

The parallel longitudinal tubular arrays lend themselves to continuous and progressive fabrication from strip sheet stock although individual array fabrication can be practiced with simple tooling and processing. The basic fabricating step is the bond of the longitudinal edges of partition strips 13 or 25, as the case may be, to face panels 11 and 12 or 22 and 23 while maintaining the strips straight, parallel and normal to the general plane of the face panels. Individual arrays can be fabricated employing a partition support having spaced parallel slots of a width to receive and constrain partition strips against buckling. Such support should have slot depths slightly less than the initial width of the partition strips to present above the slot walls that portion of each strip longitudinal edge which is to be incorporated in the bond to the face panel. A face panel laid on the protruding strip edges can be bonded to those edges by applying sufficient heat to the exposed face panel surface to melt the edges and enough pressure to press the panel into those edges while the opposite edges of the strips are restrained by the slot bottoms. Once the bonds are completed, the assembly can be inverted and rods or tines placed between the partitions to support them during the application of the second face panel. Once again the exposed longitudinal edges of the partitions should be defined by the rod dimensions from the bonded face panel and should be the amount of material desired to be incorporated in the bond to the second face panel. Heat applied through the outer face to melt the partition edges and pressure to force the melted material into the outer face forms the second bond. In each of the bonding operations, the partition supports limit by their dimension along the partition widths the amount of displacement of the heated face panel and thereby the amount of partition material introduced into the bond.

Figure 4:
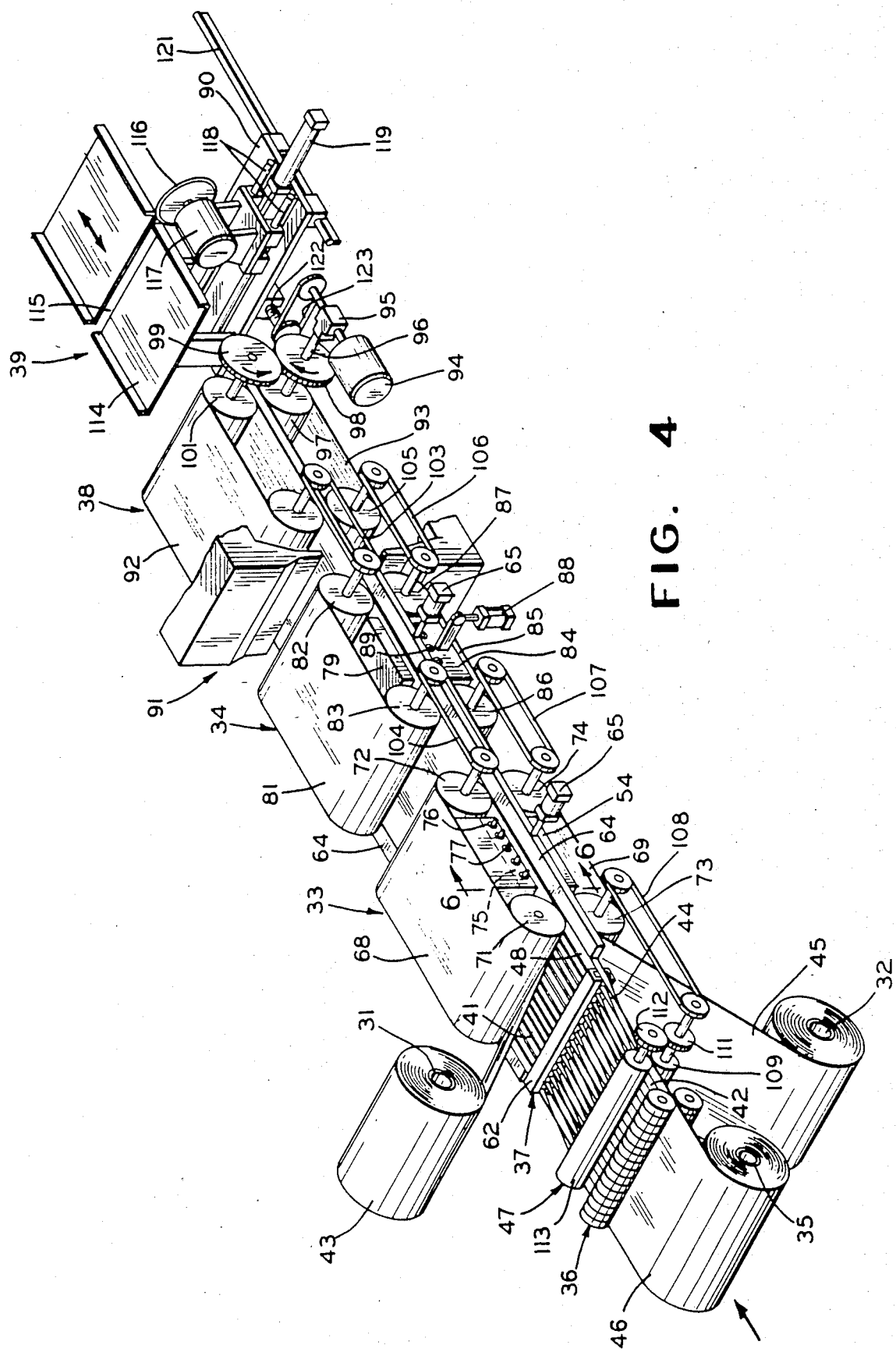
FIG. 4 is a schematic perspective view of a machine according to this invention for forming the array of square tubes in a flat panel as shown in FIG. 1.

FIG. 4 shows an apparatus for a continuous and progressive formation of tubular arrays wherein coiled strip sheet stock is fed into the apparatus and arrays cut to length, as for industrial storage battery plates, issue from the apparatus. Face panel fabric reels 31 and 32 supply sheet strips to first and second bonding stations 33 and 34. Strips of partion film from a reel 35 and film slitter 36 are fed to a strip orientor 37 and thence to the bonding stations 33 and 34 between the face panel fabric runs. A traction assembly 38 draws the bonded length of tubing array through the bonding stations and advances the leading end of the length into a flying cut-off station 39 which cuts battery plate lengths of tube array from the leading end.

The tube array forming process illustrated in FIG. 4 involves bonding the upper longitudinal edge 41 of partition strips 42 to the upper face panel fabric 43 lower surface in bonding station 33 and bonding the lower longitudinal edge 44 of strips 42 to the lower face panel fabric 45 upper surface in bonding station 34. Partion sheet film 46 is drawn from reel 35 through slitter 36 by driven pinch rollers 47 which are synchronized in their speed with the drives for the remaining elements of the system. The slitter 36 can be of the shear type involving a series of alternating discs of greater and lesser diameter on shaft and of a thickness corresponding to the width of the slit strips opposed by corresponding interdigitating discs on a second shaft where the disc peripherial speeds correspond to the lineal speed of the stock to be slit. The film partition strips 42 are maintained in alignment through the pinch rollers 47 and are turned ninety degrees around their lengths into the orientor 37.

Figure 5:
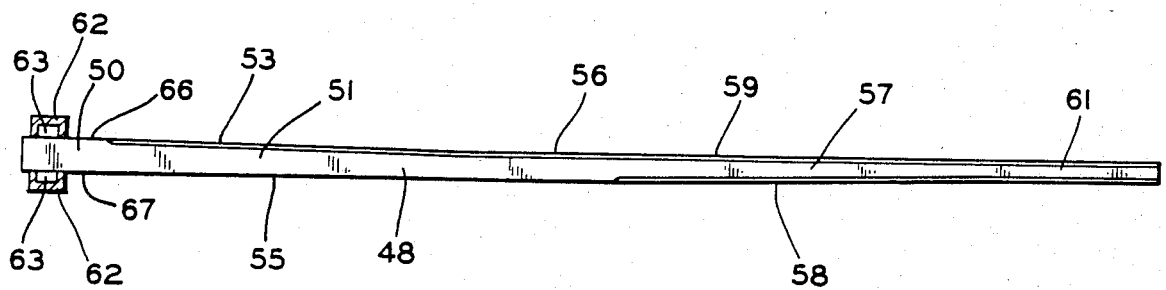
FIG. 5 is a side elevational view of a partition guiding tine for the apparatus of FIG. 4.
Figure 6:
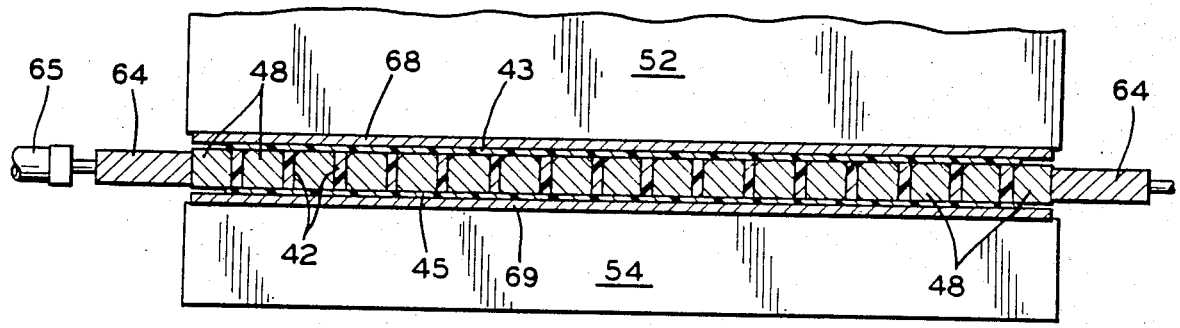
FIG. 6 is a sectioned view of a bonding station taken at lines 6—6 of FIG. 4.

As best seen in FIGS. 5 and 6 the partition strip orientor 37 is made up of a group of tines or rods 48 arranged as tines spaced about the thickness of the partition plastic film to provide closely fitting guide slots 49 for the partitions strips through bonding stations 33 and 34. The tines 48 are of a constant width which defines the width of the tubes formed around them and of a varying height to control the bonding of the strip partition edges as they are melted into the face panel fabric.

The bond between the upper face panel 43 and the upper longitudinal edges 41 of the partition strips 42 is progressively developed in bonding station 33 by progressively melting edges 41 and pressing their melted portions into panel 43. Tines 48 as viewed in FIG. 5 have an initital portion 49 of constant cross section along a length 50 preceding the bonding station 33. Section 50 has a height of at least the width of the partition strips as they are slit from sheet 46. Tine section 51 which registers with the bonding station 33 has a tapered height which reduces along the direction of material flow so that the heater 52 pressed toward the upper face 53 of section 51 approaches and engages the partition upper edges 41 while the back up 54 supporting the untapered bottom 55 of the tines support the lower longitudinal edges 44 of the strips. Thus, in the case of a melt down of 0.030 inch of edge material, the taper in section 51 of the tines will reduce from a dimension from the edge adjacent the back up surface 54 somewhat greater than the strip width at the slitter end to the strip width less the 0.030 inch to be melted into the bond at the bonding station exit end.

Following the first bonding region, the tines 48 are of uniform cross section along a region 56 until they enter the second bonding region of station 34 at section 57. In this bonding region the lower longitudinal edges 44 are melted into facing fabric 45 on the bottom of the run and therefore the bottom face 58 of the tines are tapered upward to effect the progressive application of heat and pressure on the edges 44 as they are advanced. Thus in section 57 of tine 48 the upper surface 59 is parallel to the initial upper surface of portion 50 and set downward therefrom at least the amount of the partition melt down in the first bonding station 51, 0.030 inch in the example, while the lower surface 58 is tapered upward toward its downstream end of the amount of the bonding melt down at the partition edges 44, 0.030 inch in the example. Beyond the second bonding region 57 the tines 48 have cross sections corresponding to the interior of the tubes formed around them. An extension to maintain dimensions until the assembly has been stabilized by cooling is represented in this section 61. As shown in FIG. 1 and 2 the partitions are splayed adjacent the face panels to form a fillet into the bond; therefore the tines 48 are chamfered at their corners to accommodate those fillets.

Tines 48 can function as orientors of the partition strips 42 after they pass through the nip of the pinch rollers 47. Rollers 47 maintain the partition material film sheet 46 under tension through slitter 36 since a suitable drag force is maintained on supply reel 35. The partition strips have their major faces maintained in a common plane through the pinch rollers 47. Down stream of rollers 47 the strips are twisted around their longitudinal axes and fed between the tines 48 clamped at their leading ends between channeled clamp bars 62 the channel sides of which fit over cleats 63 transverse of the upper and lower faces of the tines 48 at the leading end of section 49. Tines 48 float in the clamp bars 62 along the transverse dimension of the panel to accommodate the variations in thickness of the film 46 since any such variation is multiplied by the number of partitions across the array and can be significant in the control of the apparatus. Side pressure is maintained on the tines to accommodate the partition thickness variations while maintaining uniform confining pressure on the partitions through the bonding and forming stations by side pressure bars 64 and pneumatic cylinders 65 which are secured to the machine frame (not shown) and are arranged to impose about fifty pounds side thrust on the bars.

Alternatively, the tines 48 can be of uniform height in the bonding stations. That is, they can be of a height less than the width of the partition strips 42 an amount equal to the desired depth of partition material to be fused into the face panel over the entire length of the bonding stations. In station 33 the tine height could be 0.030 inch less than the slit width of strips 42 and in station 34 the tine height could be stepped down to 0.060 inch less than the slit width to dictate a melt in of 0.030 inch into each of the upper and lower face panels 43 and 45.

Down stream of the tine clamp bars 62 the face panel sheet stock is fed into engagement with the upper 66 and lower 67 surfaces of the tines 48 and in sliding engagement therewith. This relationship is maintained throughout the balance of the length of the tines. In order to minimize the frictional force imposed on the face panels in bonding stations 33 and 34 by the heaters and back-up surfaces, driven flexible surfaces 68 and 69 are interposed between the panels and the heaters and back-up surfaces to move with the fabric panels 43 and 45. These friction reducing surfaces at least at the heaters should be of high heat conductivity material. Stainless steel flexible belts 68 and 69 are provided in station 33 to move in the direction of advance of the panel sheet stock 43 and 45 at their speed of advance by means of supporting rollers 71 and 72 for belt 68 and rollers 73 and 74 for belt 69.

Bonding station 33 comprises an upper heater 52 and a back-up plate 54 each of which are arranged to bear indirectly through the friction reducing belts 68 and 69 against the outer surface of face panel sheets 43 and 45 respectively. Back-up plate 54 can be fixedly mounted on the apparatus frame and heater 52 is mounted for movement normal to the major face of sheet 43 to impose pressure through that sheet onto the upper longitudinal edges 41 of the partitions 42. Heater 52 can be a casing lying between the upper and lower run of belt 68 and housing a cast iron block 75 having suitable cavities 76 to receive electrical heater cartridges 77. In a horizontal run of the strip stock, the gravitational forces on block 75 apply adequate pressure to effect the desired bond if the block weighs about five hundred pounds and is applied to an array of fifteen tubes employing sixteen partitions.

Cooling can be applied to the upper face panel 43 after it leaves the bonding station 33 and before it is passed into bonding station 34 to accelerate the solidification of the melted partion material. In bonding station 34 the lower face panel material 45 is bonded to the partitions by an arrangement of parts inverted from those of station 33. Back-up plate 79 bears on the inner face of the bottom run of belt 81 trained over rollers 82 and 83. Heater block 84 bears on the upper run of belt 85 trained over rollers 86 and 87. Back-up plate 79 is fixed to the apparatus frame. Heater block 84 is biased upward toward the lower face of face panel sheet 45 by pneumatic cylinders 88. Electric heater cartridges 89 are provided in heater block 84.

The bonded tubular array is passed through a cooling station 91 where the bonds are set up by jets of cooling air prior to the application of traction pressure to the array in traction assembly 38. The upper and lower face panel runs and the partitions are driven through the apparatus at a constant speed by synchronized drives for rollers 47, belts 68 and 69, belts 81 and 85, traction belts 92 and 93 and the cut-off trolley 90 of the flying cut-off station 39. One arrangement is to drive all elements from a common drive motor 94 through a drive 95 having an output shaft 96 to lower traction assembly drive roller 97 and through gears 98 and 99 to upper traction assembly drive roller 101. The balance of the rollers are coupled through the belts engaging the work strip and drive belts. Upper traction roller 102, driven by upper traction belt 92, drives belt 103 which drives roller 82 for upper bonding station belt 81 and thus roller 83 which drives belt 104 to roller 72 for bonding station belt 68 and roller 71. The lower face panel material 45 is driven through belt 93 which drives roller 105 to belt 106 which drives roller 87 in the lower bonding station to drive belt 85 and roller 86 which drives belt 107 to roller 74 of the upper bonding station to drive belt 69 and roller 73 which drives belt 108 to lower pinch roll 109 and through gears 111 and 112 to upper pinch roll 113.

The relatively rigid board like tube array is compressed between and frictionally engaged by traction surfaces of belts 92 and 93 which may be of elastomeric material to provide effective traction to pull the strip material through the orientor 37 and the bonding stations 33 and 34. The array strip advances from traction assembly 38 to the table 114 of cut-off trolley 90 where it is cut to the desired length on the fly. The table 114 is slotted at 115 to pass a cut-off wheel 116 driven by motor 117 and arranged to traverse the trolley on ways 118 when driven by pneumatic cylinder 119. Trolley 90 is mounted on ways 121 to move along the feed path of the strip material. It is driven in the feed direction at the speed the strip issues from the traction assembly by a reversing ball screw drive 122, driven by belt 123 from output shaft 124 from drive 95. Typically, for industrial battery plate casings, the tubular array of a plate casing is cut off in lengths of about eighteen inches although such applications are commonly in lengths of from nine to twenty four inches and the apparatus can be arranged to produce such lengths.

The apparatus for producing an array of parallel tubes as shown in FIGS. 1, 2 and 3 generally comprises means to support a plurality of partition strips 13 or 42, each having parallel longitudinal edges 41 and 44 bordering opposed major faces and of a stiff sheet material. The strip support means in the example being an array of tines 48 having spaced sides which are straight and parallel to define slots 49 which maintain the major faces of the strips parallel and their longitudinal edges parallel. Means to support a facing sheet against a longitudinal edge of each strip 42, the upper edge in the drawings, in the form of the surface of an element, either the heater block or the belt 68, bearing against the facing sheet is provided while the sheet is in the bonding station 33. Since the facing sheet is of a material which has a higher melting temperature than the partition strip material, the longitudinal edge of the partition material is melted down and the face material is displaced toward the strips by means to apply heat and pressure to the face of the first facing sheet opposite the face adjacent the first edges of the partition strips at a temperature above the partition strip melting temperature and below the facing sheet melting temperature. The degree of such displacement is controlled by the tine thickness which in at least a portion of the bonding region 33 has a thickness less than the width of the major faces of the strips it is adapted to support an amount equal to the depth of melting of the strip first longitudinal edge, 0.030 inch in the example. A second support for the partition strips maintains their major faces parallel and their second longitudinal edges parallel. This second support can also be an array of tines and advantageously, can be extensions of the tines providing the first support for the partition strips. Means to support the second facing sheet against the second longitudinal edges 44 of the partition strips 42 establishes a relationship between that sheet and the strips for bonding them by means to apply heat and pressure to the face of the second facing sheet opposite the face of that sheet adjacent the second longitudinal edge of the strips. While the first and second facing strips have been disclosed to be of the same material, it is to be appreciated that the second strip could be of a material having a third melting temperature above the melting temperature of the partition sheet material and the second heating means could be heated to a temperature above the melting temperature of the partition material and below that third melting temperature to affect the fusion bond of the sheet to the partitions. Again the support in the second bonding region can be an array of tines having at least a portion of the length of each tine of a thickness less than the width of the major face of the partition strip it is adapted to support an amount equal to the depth of the strip second longitudinal edge to be melted into the bond. The tines can be tapered in the bonding stations 33 and 34 to gradually melt in the partition material where the partitions and facing sheets are advanced longitudinally and progressively and precise control of each bond melt depth can be achieved where the bond stations are in tandem along the advance direction so that each partition edge is bonded individually and separately. The partition support means, the face panel support means and the heating and pressing means cooperate to form first and second bonding stations which are spaced along the path of longitudinal advance of the strips and sheet so that the second station elements are downstream of the first. An alignment of the elements of the apparatus along the direction of advance of the sheets and partition strips enables continuous processing from the strip supply reel supports to the cooling station and the cut-off. The cut-off includes a cut-off wheel and tube array support table which are reciprocable and synchronized in the advance direction with the array advance.

Figure 7:
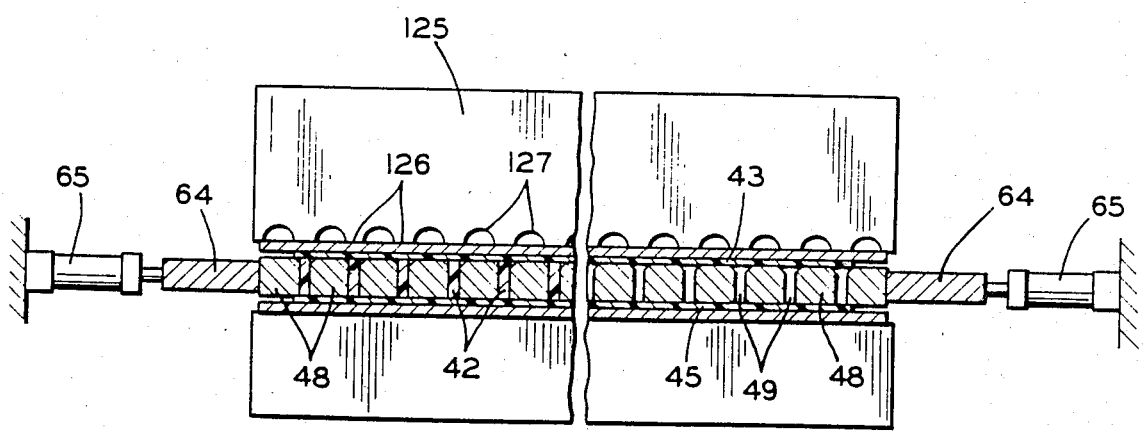
FIG. 7 is a sectioned view corresponding to FIG. 6 for an alternative bonding station arrangement.

An alternative form of bonding station wherein the friction reducing belts have been eliminated, at least between the heater block and the face panel to which the partition is being bonded, to enhance the concentration of applied heat at the longitudinal bands in which bonds are to be formed is shown in FIG. 7. Heater block 125 differs from block 75 in that it is in direct contact with face panel strip 43 in registry with the grooves between tines 48 in which partition strips 42 are retained. The contact regions 126 extend in the direction of travel of the face panel and partition strips and the block is relieved as by intermediate grooves 127 to reduce the contact area between the block and fabric thereby reducing the friction developed for a given bonding pressure for the block contact. A smooth backup plate 128 has been shown engaging lower face panel 45 although it could be relieved between the partitions in much the same manner as heater block 125 if friction forces required reduction.

It is to be understood that the tubular array provided as described above might be used for other than the casings of storage battery plates and that the facing and partition materials might be chosen to be of materials other than the polyester and lower temperature melting polyethylene or polyolifine discussed. Further, the specific material driving and heating structures could be modified, for example, by heating both longitudinal edges of the partition strips simultaneously to bond to both faces in a single bonding station pass, with some loss of pressure and bond penetration control, or by introducing one of the facing panel sheet stock runs into the second bonding station 34 after the partitions have been bonded to the opposite panel. The partitions could be presented to the apparatus as strips rather than in sheet form. Traction surfaces could be provided on the friction reducing belts or as shown in FIG. 7 the belts could be eliminated. While it is advantageous in battery applications to avoid introduction of bonding compositions to the structure, the bonds can be made between the longitudinal edges and the face panels by applying a softening solvent to the edges or by applying adhesive although care must be exercised to avoid producing softened material or adhesive on the tines. Thus the invention lends itself to variations and it is to be appreciated that the present disclosure is to be read as illustrative and not in a restrictive sense.

What is claimed is:

1. A tubular casing for an electrode for batteries comprising:
    a pair of spaced porous outer panels of electrolyte-resistant, fibrous fabric;
    a plurality of electrolyte-resistant, parallel strips having their major faces perpendicular to and extending between said outer panels; and
    fusion bonds of the material of said strips fused into the interstices of the fibrous fabric of said outer panels between the longitudinal margins of said strips and said outer panels.

2. A tubular casing according to claim 1 wherein said spaced outer panels are essentially planar and parallel, and said parallel strips are of uniform width.

3. A tubular casing according to claim 1 wherein said outer panels are rectangular and are formed with longitudinal corrugations, and said strips are bonded to the troughs of the corrugations.

4. A tubular casing according to claim 1 wherein said outer panels are rectangular and are formed with regularly spaced V grooves having the apexes of the V grooves on opposing panels aligned across the space between the panels and having said strips bonded to the aligned apexes of opposing panels.

5. A tubular casing according to claim 1 wherein said strips are of a smooth surfaced, film material.

6. A tubular casing according to claim 1 wherein said material of said strips is of a lower melting temperature than the material of said outer panels and is thermally fused into the interstices of the fibrous fabric of said outer panels.

* * * * *